United States Patent [19]

Bayliss

[11] Patent Number: 4,778,227

[45] Date of Patent: Oct. 18, 1988

[54] SOLENOID OPERATED FLUID FLOW CONTROL VALVES

[75] Inventor: John P. Bayliss, Worcestershire, England

[73] Assignee: Lucas Industries public limited company, England

[21] Appl. No.: 59,108

[22] Filed: Jun. 8, 1987

[30] Foreign Application Priority Data

Jun. 14, 1986 [GB] United Kingdom ................. 8614516
Sep. 16, 1986 [GB] United Kingdom ................. 8622278

[51] Int. Cl.$^4$ ......................... B60T 8/36; F16K 31/04
[52] U.S. Cl. ................................. 303/119; 137/627.5; 251/129.21; 303/113
[58] Field of Search .......................... 137/596.16, 627.5; 251/129.16, 129.21; 303/113, 116, 119

[56] References Cited

U.S. PATENT DOCUMENTS 4,579,146 4/1986 Tsuru et al. ....................... 137/627.5
4,655,255 4/1987 Rode ................................. 137/627.5

Primary Examiner—Duane A. Reger
Attorney, Agent, or Firm—Laff, Whitesel, Conte & Saret

[57] ABSTRACT

A solenoid-operated fluid-flow control valve comprising a single solenoid coil, the energization of which controls the movement of first and second armatures which in turn control first and second respective valve members. The armatures are biased away from the solenoid by respective springs, one of which is weaker than the other. When the solenoid is energized by a constant current the armature with the weaker spring is attracted to the end of the solenoid and forms part of a magnetic circuit. This increases the magnetic flux at the other end of the solenoid, allowing the second armature to be drawn to the solenoid sequentially after, and subsequent to, the drawing-in of the first armature. Particular anti-lock brake systems incorporating the valve are disclosed.

16 Claims, 2 Drawing Sheets

SOLENOID OPERATED FLUID FLOW CONTROL VALVES

This invention relates to improvements in solenoidoperated fluid-flow control valves. Particularly the invention is concerned with solenoid-operated flow control valves for use in hydraulic anti-skid braking systems for vehicles.

Known solenoid-operated flow control valves for use in hydraulic anti-skid braking systems usually incorporate two solenoid coils, each of which controls a respective valve, and the coils are energised sequentially in response to energising currents dependent upon skid signals from a wheel speed sensor in order to control the behaviour of a respective braked wheel. For example, one of the valves may control either directly or indirectly the supply of brake-applying fluid to brake-applying means, and the second valve may act as a brake-pressure release device operative to reduce the pressure of fluid applied to the brake when a skid signal is operative.

I am also aware of U.S. Pat. No. 4,619,289 of Nippondenso Co. Ltd. of Japan, which discloses an anti-skid system in which a single solenoid coil is arranged to control two valves sequentially by varying the current to the solenoid from a low level at which only one valve operates to a high level at which both valves are operated.

According to my invention a solenoid-operated fluid-flow control valve comprises a single solenoid coil, the energisation of which is adapted to control first and second armatures associated with first and second respective valve means controlling flow between opposite first and second ends of the solenoid coil, and means are incorporated to ensure that when the solenoid coil is energised at a substantially constant level of energisation the first and second valve means operate sequentially.

Preferably each valve means comprises a valve member for co-operation with a seating at or adjacent to a respective end of the solenoid coil, and a spring for urging the valve member in one direction with respect to the seating, the relative strengths of the springs being chosen such that, upon energisation of the solenoid coil, one valve member is moved relatively towards its respective seating before the other valve member is moved away from its respective seating.

The first valve means may comprise a valve member for co-operation with a seating on the central core of the coil, and the second valve means may comprise a second valve member for co-operation with a seating spaced from the opposite end of the coil.

In such a construction the spring which acts to urge the first valve member away from the seating is weaker than the spring of the second valve means. Specifically the relative strengths of the two springs are chosen to ensure that upon energisation of the single solenoid coil at a single energy level the strength of the flux field which increases upon the co-operation of the first valve member with the seating can overcome the loading in the spring of the second valve means.

Alternatively the force acting on the armatures can be varied by varying the spring loading acting on the armatures, varying the flux density from one end of the solenoid to the other, or by varying the pole area of the ends of the solenoid, or by any combination of these three means.

When the solenoid-operated valve is incorporated in an hydraulic anti-skid braking system for vehicles, the first valve means controls the supply of fluid to brake-applying means, and the second valve controls a flow path from the brake-applying means to a reservoir or dump chamber for fluid, energisation of the solenoid coil in response to a skid signal causing the first valve member to engage with the seating to isolate the supply of fluid from the brake-applying means, followed by movement of the valve member of the second valve means away from the respective seating to release pressure from the brake-applying means.

In one construction the energy from a brake-application sustaining source, suitably an hydraulic accumulator, is applied to the brake-applying means through a fixed restrictor and a variable restrictor in series with it, the variable restrictor being defined by co-operation of the valve member of the first valve with a its seating on the central core.

This ensures that the second valve will isolate the flow path to the reservoir before the double-acting valve can re-apply the pressure from the sustaining source to the brake-applying means.

The fixed restrictor may comprise an orifice in a flexible diaphragm which otherwise provides an imperforate seal between the accumulator and the brake-applying means.

In another construction energy from a brake-applying re-application means suitably an hydraulic pump, is applied to the brake-applying means through a fixed restrictor and a variable restrictor in series with it, the variable restrictor being defined by the co-operation of a valve member carried by a diaphragm with a seating spaced from the seating at the end of the core and with which the first valve member of the first valve means is engageable, and the fixed restrictor is provided in the diaphragm itself.

Two embodiments of our invention are illustrated in the accompanying drawings in which.

Figure 1:
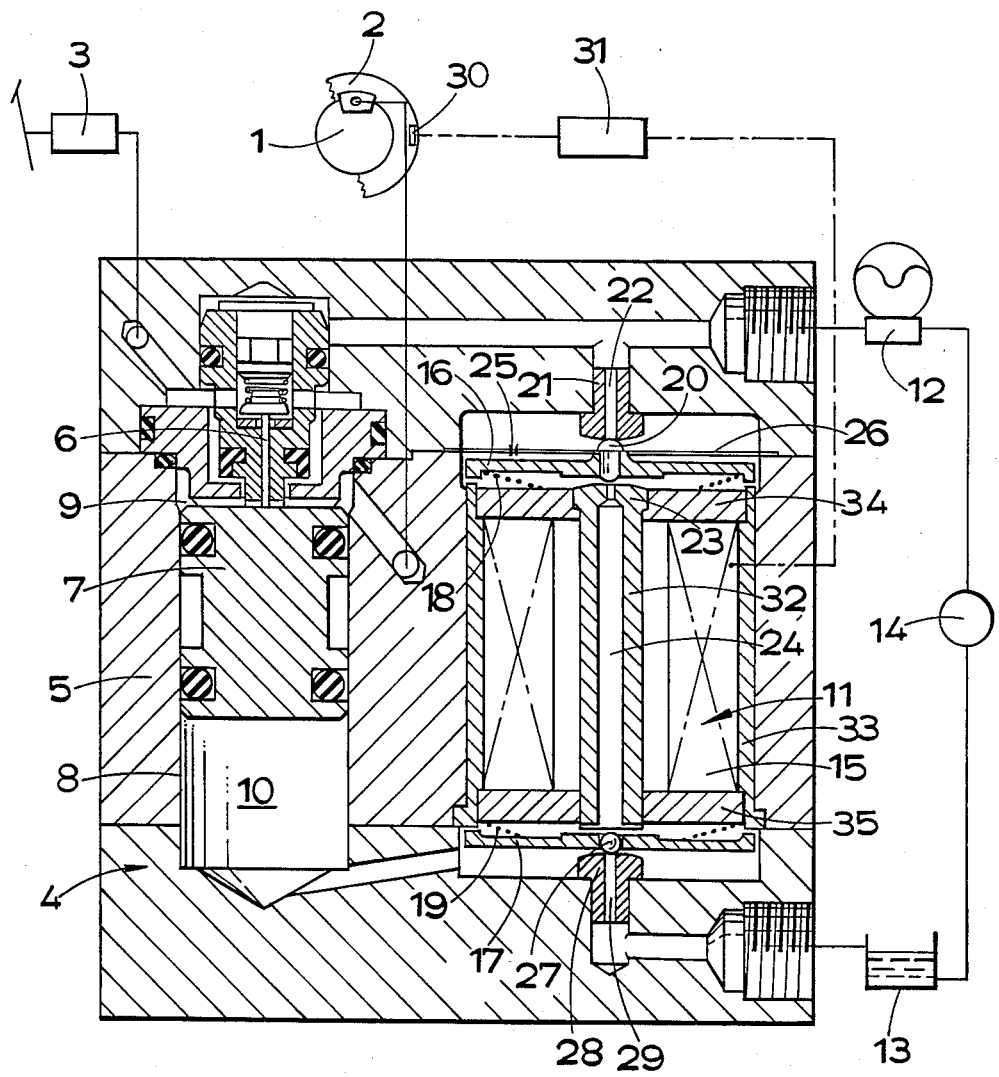
FIG. 1 is a layout of an hydraulic anti-skid braking system for a vehicle.

In the braking system illustrated in FIG. 1 of the drawings a brake 1 on a wheel 2 of a vehicle is adapted to be applied by a pedal-operated master cylinder 3, and the supply of fluid from the master cylinder 3 to the brake 1 is modulated in accordance with the behaviour of the wheel 2 by a modulator assembly 4.

The modulator assembly 4 comprises a housing 5 incorporating a cut-off valve 6 which is operated by an expander piston 7 working in a bore 8. An expansion chamber 9 is defined in the bore 8 between the piston 7 and the valve 6, and the position of the piston 7 in the bore 8 is determined by the volume of fluid trapped in a support chamber 10 at the opposite end of the piston 7.

A solenoid-operated valve 11 incorporated in the housing 5 controls the supply of fluid to the chamber 10 from an hydraulic accumulator 12 and the release of fluid from the chamber 10 to reservoir 13 from which the accumulator 12 is charged by a pump 14 which is either driven by an electric motor, or from the prime mover of the vehicle.

The solenoid-operated valve 11 comprises a single solenoid coil 15 for controlling operation of first and second armatures 16 and 17 at opposite ends of the coil 15 and which are biassed away from the coil 15 by first and second respective compression springs 18 and 19 of which the spring 18 is weaker than the spring 19. The armatures 16 and 17 may be equal in area. The coil 15 has a central core 32 and an external cylinder housing 33 which are interconnected by annular end closures 34 and 35 of non-magnetic material.

When the solenoid coil 15 is energised the flux path through the solenoid-operated valve 11 passes through the central core 32, the armature 16, the housing 33, the armature 17, and the central core 32.

The armature 16 controls operation of a double acting valve comprising a double-acting valve member 20 for alternative engagement with a first seating 21 surrounding a passage 22 leading from the accumulator 12, and a second seating 23 at the adjacent end of the central core 32 and surrounding a central passage 24 passing through the core 32. The co-operation of the valve 20 with the seating 23 defines a variable restrictor which is in series with a fixed restrictor comprising an orifice 25 in a circular flexible diaphragm 26. The diaphragm 26 is sealed at its inner peripheral edge to the valve member 20, and at its outer peripheral edge to the wall of a chamber in which the armature 16 is housed.

The armature 17 controls operation of a single acting valve comprising a single acting valve member 27 for engagement with a seating 28 surrounding a passage 29 leading to the reservoir 13.

The speed of rotation of the wheel 2 is sensed by an electrical speed sensor 30, and signals from the sensor 30 are fed into an control module 31 which, according to the nature of the signal, produces an electrical current to energise the solenoid coil 15 in order to actuate the solenoid-operated valve in a manner to be described.

In an inoperative brake-applying position the solenoid-coil 15 is de-energised and the expander piston 7 is held in an advanced position by pressure from the accumulator 12. The piston 7 holds the valve 6 open so that free communication is provided from the master cylinder 3 to the brake 1 through the expansion chamber 9 of which the effective volume is at a minimum.

When the control module 31 detects from the signal from the speed sensor 30 that the wheel 2 is approaching a critical condition, it emits an electric current which energises the solenoid coil 15. Initially the coil 15 draws the armature 16 towards it against the force in the spring 18 to cause the valve member 20 to engage with the seating 23. This isolates the accumulator 12 from the support chamber 10.

The engagement of the valve member 20 with the solenoid coil 15 increases the strength of the flux field so that, subsequently and sequentially, at the same energy level the armature 17 is urged towards the solenoid coil 15 against the load in the spring 19 to urge the valve member 27 away from the seating 28. This dumps the fluid in the support chamber 10 to the reservoir and the piston 7 retracts, initially to permit the valve to close and isolate the master cylinder from the brake 1, and subsequently to increase the effective volume of the expansion chamber 9 to relieve the pressure applied to the brake.

The pressure drop across the valve member 20, caused by the dumping of the fluid in the support chamber 10, enhances the engagement of the valve member 20 with the seating 23 and assists in holding the valve member 20 in this position.

When the speed of the wheel recovers, the solenoid coil 15 is de-energised. Initially the armature 17, due to the stronger spring 19, urges the valve member 27 into engagement with the seating 28 to isolate the chamber 10 from the reservoir 13, while the pressure differential across the valve 20 assists in delaying the movement of the armature 16. Thereafter the armature 16 moves away from the solenoid coil 15 and fluid from the accumulator, which defines the brake-application sustaining source, is applied to the chamber 10 at a controlled rate determined by the flow through the two restrictors. This advances the piston 7 in the bore 8 to re-apply the brake 1 at an equivalent controlled rate by pressurising the fluid in the expander chamber 9.

The sequential operation of the two valves is assisted by the respective pressure drops across the valve members of the respective valves.

The double-acting valve controlled by the armature 16 performs a number of functions:-
1. The valve acts as a cut-off valve to isolate the accumulator 12 from the chamber 10 when the solenoid coil 15 is energised in response to a skid signal; and
2. The valve acts as a re-application valve to control re-application of the brake 1 at a controlled rate at the termination of the skid-signal with the valve member 20 co-operating with the seating 23 to define the variable restriction.

In the event of loss of pressure from the accumulator 12, for example by rupture of a supply pipe, the valve member 20 seats against the seating 21 to prevent evacuation of fluid from the support chamber 10. This ensures that the brake 2 can still be applied effectively.

The system may be operated in other ways by varying the energy level applied to the solenoid coil 15 in response to a skid-signal.

For example, after closing the double-acting valve controlled by the armature 16, and opening the valve controlled by the armature 17, the control module 31 may then reduce the energy level by an amount sufficient to allow the valve controlled by the armature 17 to close. This acts as a HOLD to prevent all the fluid being dumped from the chamber 10 and, in consequence, it limits the amount by which the pressure applied to the brake is reduced.

In another example, after closure of the double-acting valve, the energy level applied to the solenoid coil 15 is reduced slightly. This ensures that the valve controlled by the armature 17 will not open until after a delay period sufficient for the control module 31 to determine that the skid signal is genuine and does not comprise a false skid, such as may be obtained from "wheel bounce".

Figure 2:
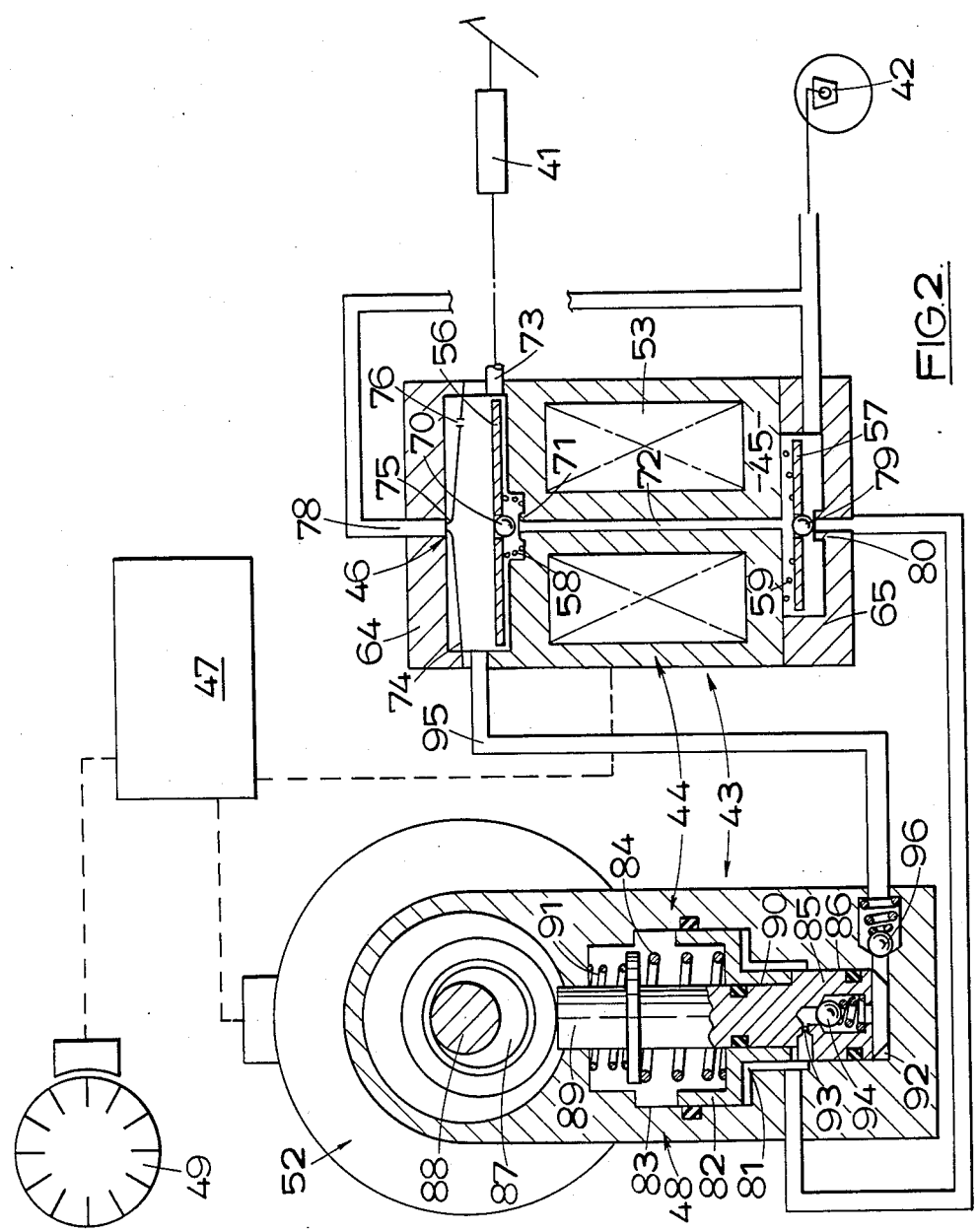
FIG. 2 is a layout of another hydraulic anti-skid braking system.

The anti-skid braking system illustrated in FIG. 2 of the drawings comprises a pedal-operated hydraulic master cylinder 41 for operating a wheel brake 42, and a modulator 43.

The modulator 43 preferably comprises a housing 44 in which is incorporated a solenoid-operated valve 45, a flow-control regulator valve 46, a pump 48 and a wheel speed sensor 49 for supplying electrical wheel speed signals to a control module 47. The control module 47 analyses the speed signals and can emit an electrical current to energise the solenoid of the exhaust valve 45 and also, separately, to operate an electric motor 52.

The solenoid-operated valve 45 controls the supply of fluid from the master cylinder 41 to the brake 42, from the brake 42 to the pump 48, and from the pump 48 to the brake 42.

As in the previous embodiment the solenoid-operated valve 45 comprises a single solenoid coil 53 for controlling operation of first and second armatures 56 and 57 at opposite ends of the coil 53 and which are biassed away from the coil 15 by first and second respective compression springs 58 and 59 of which the spring 58 is weaker than the spring 59. The coil 53 has a central core and an external cylinder housing which are interconnected by annular end closures 64 and 65 of non-magnetic material.

The area of the pole at the end of the coil 53 for co-operation with the armature 57 is smaller than the area of the pole at the opposite end for co-operation by the armature 56.

When the solenoid coil 53 is energised the flux path through the solenoid-operated valve 45 passes through the armature 56, the housing, the armature 57, and the central core.

The armature 56 controls operation of a valve member 70 for engagement with a seating 71 at the adjacent end of a passage 72 through the coil 53 to control communication between the master cylinder 41 and the passage 72 which is in direct communication with the brake 42.

A flexible diaphragm 74 located above the armature 56 carries a central valve member 75 for engagement with a seating surrounding an outlet connection 78 leading to the brake 42 and with which it defines a variable flow control orifice, and a fixed orifice 76 in the diaphragm provides a control flow therethrough.

The armature 57 controls operation of a valve member 79 for engagement with a seating 80 between the brake 42 and an expander chamber 81 in the pump 48. The chamber 81 constitutes a substantially constant, low pressure, reservoir for the pump 48 and is closed at its upper end by an expander piston 82 working in the portion 83 of a bore of stepped outline which is of largest diameter. Normally a caged compression spring 84 urges the expander piston 82 into an advanced position in which the effective volume of the expander chamber 81 is at a minimum.

The pump 48 comprises a plunger 85 which works in the portion 86 of the stepped bore which is of smaller diameter. The plunger 85 is driven in one direction during a power stroke by an eccentric cam 87 on a drive shaft 88 from the electric motor 52, and in the opposite direction, during an induction stroke, by the spring 84. The cam 87 acts on plunger 85 through a push-rod 89 which works through a bore 90 in the expander piston, and in an inoperative position, the push-rod 89 is held out of engagement with the cam 87 by means of a light compression spring 91. During the induction stroke fluid is drawn from the chamber 81 and into a pumping chamber 92 at the outer end of the stepped bore through a restriction 93 and a one-way inlet valve 94 and during the power stroke, fluid is discharged from the chamber 92 and into a line 95 between the seating 71 and the diaphragm 74 through a one-way outlet valve 96.

In the inoperative position shown the pump 48 is disabled with the push-rod 89 held out of engagement with the cam 87 by the engagement of the expander piston 82 with the plunger 85. The solenoid 45 is de-energised with the valve member 70 held away from the seating 71 by the spring 58, and the valve member 79 held in engagement with the seating 80 by means of the spring 59. The motor 52 is not driven.

When the master cylinder 41 is operated to apply the brake 42 fluid flows to the brake 42 through the seating 71 and the passage 72, but flow to the chamber 81 is prevented by the engagement of the valve member 79 with the seating 80. A relatively minor, subsidiary, flow to the brake also takes place through the fixed orifice 76 and the variable orifice 75, 78.

When the control module 47 detects from the signal from the speed sensor 49 that the wheel is approaching a critical condition, it is operative to energise the solenoid of the valve 53 and the electric motor 52 to cause the shaft 88 to rotate. Initially the coil draws the armature 56 towards it against the force in the spring 58 to cause the valve member 70 to engage with the seating 71. This effectively isolates the master cylinder 41 from the brake 42, apart from the relatively minor flow through the control valve 46. The pressure drop across the valve member 70 enhances the engagement of the valve member 70 with the seating 71 and assists in holding the valve member 70 in this position.

The engagement of the valve member 70 with the solenoid coil increases the strength of the flux field so that, subsequently and sequentially, the armature 57 is urged towards the solenoid coil against the load in the spring 59 and the valve member 57 moves away from the seating 80. This dumps the fluid in the brake 42 to the chamber 81 and the piston 82 retracts relatively towards the cam 87 against the force in the spring 84. This enables the push-rod 89 to engage with the cam 87, and the pump 48 is operable to admit fluid at low pressure from the expander chamber 81 through the inlet valve 94 and pump it into the passage 95 through the outlet valve 96 as described above. The reciprocating movement of the plunger 85 is limited by the throw of the cam 87.

Whilst the skid signal is being received by the control module 47, the valve member 70 is held in engagement with the seating 71 to prevent direct communication between the master cylinder 41 and the brake 42.

During the period of the dump cycle when the solenoid valve 45 is activated, fluid is circulated through the system from the pump 48 into passage 95, through the flow control regulator valve 46, the open valve 79, 80 and back to the pump via the expander chamber 81. Due to the pressure differential across the diaphragm 74 caused by the high pressure pump output which exists in the chamber beneath the diaphragm 74 and the substantially (negligable) zero pressure which exists in passage 78, the diaphragm 74 moves in a direction to restrict the variable orifice controlled by the position of the valve member 75. A controlled low pressure flow is thus permitted to return to the pump 48 and fluid will not be lost from the master cylinder 41.

The pressure existing in the chamber between the flow control regulator valve 46 and the closed valve 70 also assists in latching the valve 71 closed.

At the termination of the skid signal, the solenoid is de-energised but the electric motor 42 continues to run for a predetermined limited period of time.

De-energisation of the solenoid allows the valve member 79 to engage with the seating 80 due to the stronger spring 59. This isolates the brakes 42 from the chamber 81. The pressure then builds up at the brake 42 and this build up is controlled initially by the pressure drop across the fixed orifice 76 which, in turn, is operative to deflect the diaphragm and permit a controlled flow through the variable orifice 75, 78 whereby to re-apply the brake 42 at a controlled rate.

When the pressure at the brake 42 almost reaches the output pressure from the master cylinder 41, the pressure drop across the seating 71, together with the load in the spring 58, are sufficient to urge the valve member 70 away from the seating 71. This re-establishes direct, unrestricted, communication between the master cylinder 41 and the brake 42.

The construction and operation of the solenoid-operated valve 45 is otherwise the same as that described above with reference to FIG. 1.

In the construction of FIGS. 1 and 2 we arrange for the two valves operated by the armatures 16 and 17 to operate sequentially by an appropriate choice of the relative strengths of the two springs 58 and 59. In the construction of FIG. 1 the armatures are of similar areas whereas, in the construction of FIG. 2 the armatures 16 and 17 are of different areas, as are the areas of the poles at opposite ends of the coil 53. In addition we can vary the flux density from one end of the solenoid to the other, or vary the pole area of the ends of the solenoid. Thus we are able to vary the force acting on the armatures by varying the spring loading acting on the armatures 16, 17, varying the flux density from one end of the solenoid 53 to the other, or by varying the pole area of the ends of the solenoid, or by any convenient combination of these three means.

We claim:

1. A solenoid-operated fluid-flow control valve comprising a single solenoid coil having opposed first and second ends, first and second valve means provided in the control valve and first and second armatures associated respectively with said first and second ends of said coil and associated respectively with said first and second valve means, wherein energisation of said solenoid coil at a substantially constant energy level controls movement of said armatures to operate said first and second valves sequentially said solenoid coil having a central core with a central core passage and said first valve means is provided at one end of said core passage and comprises a valve member on said first armature which co-operates with a valve seating on said core and said second valve means is at or adjacent the other end of said core passage, means defining a variable restrictor operable in response to movement of said first valve member relative to said valve seating, and means defining a fixed fluid restrictor acting in series with said variable restrictor.

2. A valve according to claim 1, wherein said first and second armatures are disposed outside of said coil.

3. A valve according to claim 1, wherein each of said valve means comprises a valve member for co-operation with a seating at or adjacent to a respective one of said ends of said solenoid coil, and a spring for urging said valve member in one direction with respect to said seating, and wherein the relative strengths of said springs are chosen such that, upon said energisation of said solenoid coil, one valve member is moved relatively towards its respective seating before the other valve member is moved away from its respective seating.

4. A valve assembly according to claim 3, wherein said first armature is at the first end of said coil and carries said one valve member and is acted on by a weaker spring and said second armature is at said second end of said coil and carries the other valve member and is acted upon by a stronger spring.

5. A valve according to claim 1, wherein upon energisation of the coil at a single energy level to produce a first magnetic flux said first armature is moved towards said first end of said coil and produces an increase in the magnetic flux of said coil to such a level as to cause said second armature to move sequentially towards said second end of said coil.

6. A valve according to claim 1, wherein the force acting on said first and second armatures is arranged to be different by varying the flux density from one end of said solenoid coil to the other.

7. A valve according to claim 1, wherein the force acting on said first and second armatures is arranged to be different by providing said ends of said solenoid coil with different pole areas.

8. A valve according to claim 1, wherein said second valve means comprises a second valve member for co-operation with a seating spaced from the opposite end of said coil.

9. A hydraulic anti-skid braking system for vehicles comprising a brake-applying master cylinder in fluid communication with brake applying means via a cut-off valve, said cut-off valve having an open condition in which brake-applying fluid pressure can be transmitted from said master cylinder to said brake-applying means and a closed condition in which said brake-applying means is isolated from the hydraulic pressure in said master cylinder, means for producing a skid signal, an expander piston movable in a bore between an advanced position in which said cut-off valve is in its open condition and a retracted position in which said cut-off valve is in its closed condition, an expansion chamber of variable volume in fluid communication with said brake-applying means and having a smaller volume when said expander piston is in its advanced position and a larger volume when said expander piston is in its retracted position, a support chamber defined in part by the part of said bore into which said piston retracts and being in fluid communication with means for supplying pressurised hydraulic fluid via a first fluid pathway, the hydraulic pressure in said support chamber determining the position of said expander piston, and a second fluid pathway being provided from said support chamber to a reservoir of hydraulic fluid, wherein a solenoid-operated fluid flow control valve is provided, said control valve comprising a single solenoid coil having opposed first and second ends, first and second valve means provided in the control valve, and first and second armatures associated respectively with said first and second ends of said coil and associated respectively with said first and second valve means, wherein energisation of said solenoid coil at a substantially constant energy level controlling movement of said armatures to operate said first and second valves sequentially, said first valve means being provided in said first fluid pathway and being operable upon energisation of said solenoid in response to a skid signal to isolate said support chamber from said means for supplying pressurised hydraulic fluid, and said second valve means being provided in said second fluid pathway and being operable upon energisation of said solenoid to open communication between said support chamber and said reservoir in response to a skid signal to dump said hydraulic fluid from said support chamber whereafter said support piston retracts to cause said cut-off valve to isolate said brake-applying means from said master cylinder and to relieve hydraulic pressure in said brake-applying means, said second valve means being arranged to operate sequentially after said first valve means operates.

10. An anti-skid system according to claim 9, wherein upon de-energisation of said solenoid coil said second valve means is released to isolate said support chamber from said reservoir before said first valve means sequentially allows said brake-applying means to receive hydraulic pressure from said means for providing hydraulic fluid.

11. An anti-skid system according to claim 10, wherein said solenoid coil has a central core having a central core passage and said first valve means is provided at one end of said core passage and comprises a valve member on said first armature which co-operates with a valve seating on said core and said second valve means is at or adjacent the other end of said core passage, pressurised hydraulic fluid from said means for providing hydraulic fluid being applied to said brake-applying means through a fixed restrictor and a variable restrictor in series with it, said variable restrictor being defined by co-operation of said valve member of said first valve means with its seating on said central core.

12. An anti-skid system according to claim 11, wherein said fixed restrictor comprises an orifice in a flexible diaphragm which otherwise provides an imperforate seal between said means for providing pressurised hydraulic fluid and said brake-applying means.

13. An anti-skid braking system for vehicles in which hydraulic braking pressure applied to brake-applying means is relieved subsequent to the production of a skid signal and is applied at a later time, the system comprising a brake-applying master cylinder in fluid communication with brake-applying means via a cut-off valve, said cut-off valve having an open condition in which brake-applying fluid pressure is transmitted from said master cylinder to said brake-applying means and a closed condition in which there is no direct communication between said master cylinder and said brake-applying means, means for providing a skid signal, brake re-applying re-application means operated in response to a skid signal, a dump fluid passageway leading from said brake-applying means and provided with a dump valve, and a brake re-applying passageway communicating the output of said re-application means to said brake-applying means via a flow control valve, wherein a solenoid operated fluid-flow control valve is provided, said control valve comprising a single solenoid coil having opposed first and second ends, first and second valve means provided in the control valve, and first and second armatures associated respectively with said first and second ends of said coil and associated respectively with said first and second valve means, wherein energisation of said solenoid coil at a substantially constant energy level controlling movement of said armatures to operate said first and second valves sequentially, said first valve means is said cut-off valve and comprises a valve member provided on said first armature which co-operates with a seating at one end of a central core passage provided in a central core of the solenoid, and said dump valve comprises said second valve means and is provided at the other end of said core passage, said cut-off valve being adapted to isolate said brake-applying means from said master cylinder upon energisation of said solenoid in response to a skid signal sequentially before said dump valve opens to relieve the hydraulic pressure in said brake-applying means.

14. An anti-skid system according to claim 13, wherein upon production of a skid signal said re-application means provides hydraulic fluid to said brake-applying means through said flow control valve which comprises a fixed restrictor and a variable restrictor being defined by the co-operation of a valve member carried by a diaphragm with a seating spaced from the seating at the end of said core passageway with which said valve member of the cut-off valve is engageable, and said fixed restrictor is provided in said diaphragm itself.

15. A solenoid-operated fluid-flow control valve comprising a single solenoid coil, inlet and outlet valve seatings, valve means provided in said control valve for co-operation with said seatings, at least one armature associated with said valve means, wherein energisation of said solenoid coil controls movement of said armature to operate said valve means, said solenoid coil having a central core with a central core L passage and at least one of said valve seatings is located at one end of said core, means defininnga variable restrictor operable in response to operation of said valve means, and means defining a fixed fluid restrictor acting in series with said variable restrictor.

16. A valve as claimed in claim 15, wherein the control valve includes a further seating, and a flexible diaphragm having an orifice which defines said fixed restrictor, and said diaphragm itself co-operates with said further seating to define said variable restrictor.

* * * * *